United States Patent
Friedrich et al.

(10) Patent No.: US 6,889,192 B2
(45) Date of Patent: May 3, 2005

(54) GENERATING VISUAL FEEDBACK SIGNALS FOR EYE-TRACKING CONTROLLED SPEECH PROCESSING

(75) Inventors: Wolfgang Friedrich, Bubenreuth (DE); Wolfgang Wohlgemuth, Erlangen (DE); Xin Ye, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 183 days.

(21) Appl. No.: 10/206,669

(22) Filed: Jul. 29, 2002

(65) Prior Publication Data

US 2003/0050785 A1 Mar. 13, 2003

Related U.S. Application Data

(63) Continuation of application No. PCT/DE01/00138, filed on Jan. 15, 2001.

(30) Foreign Application Priority Data

Jan. 27, 2000 (DE) .......................................... 10003549

(51) Int. Cl.[7] ............................................. G10L 21/00
(52) U.S. Cl. ....................... 704/275; 704/270; 704/271; 704/231; 704/277
(58) Field of Search ................................ 704/271, 275, 704/270, 231–235, 277, 200, 9, 10, 251, 257; 706/45; 345/156, 420, 8; 701/14; 703/1; 708/141

(56) References Cited

U.S. PATENT DOCUMENTS

| | | | | |
|---|---|---|---|---|
| 4,117,265 A | * | 9/1978 | Gerlach ....................... 704/277 |
| 4,421,486 A | * | 12/1983 | Baldwin et al. ............. 352/132 |
| 4,786,088 A | * | 11/1988 | Ziu ........................... 285/123.1 |
| 5,138,555 A | * | 8/1992 | Albrecht ....................... 701/14 |
| 5,408,603 A | * | 4/1995 | Van de Lavoir et al. ....... 704/9 |
| 5,495,576 A | * | 2/1996 | Ritchey ....................... 345/420 |
| 5,583,795 A | * | 12/1996 | Smyth .......................... 702/150 |
| 5,588,139 A | * | 12/1996 | Lanier et al. ................... 703/1 |
| 5,632,002 A | * | 5/1997 | Hashimoto et al. ......... 704/231 |
| 5,668,573 A | * | 9/1997 | Favot et al. ................. 345/156 |
| 5,689,619 A | * | 11/1997 | Smyth .......................... 706/45 |
| 5,751,260 A | * | 5/1998 | Nappi et al. .................... 345/8 |
| 5,864,815 A | * | 1/1999 | Rozak et al. ............... 704/275 |
| 5,948,047 A | * | 9/1999 | Jenkins et al. .............. 708/141 |
| 6,047,299 A | * | 4/2000 | Kaijima ....................... 704/10 |
| 6,075,534 A | * | 6/2000 | VanBuskirk et al. ........ 704/275 |
| 6,366,578 B1 | * | 4/2002 | Johnson ...................... 704/200 |
| 6,526,159 B1 | * | 2/2003 | Nickerson ................... 345/156 |
| 6,629,074 B1 | * | 9/2003 | Tannenbaum ............... 704/270 |
| 2001/0005825 A1 | * | 6/2001 | Engelke et al. ............. 704/235 |
| 2002/0156634 A1 | * | 10/2002 | Blum et al. ................. 704/270 |

FOREIGN PATENT DOCUMENTS

| | | | | |
|---|---|---|---|---|
| DE | 43 06 508 A1 | 9/1994 | | |
| DE | 43 07 590 A1 | 9/1994 | | |
| DE | 197 31 303 A1 | 2/1999 | | |
| DE | WO 01/56017 A1 | * 8/2001 | ........... G10L/15/26 |
| EP | 0 718 823 A2 | 6/1996 | | |
| JP | 61-180329 | * 8/1986 | ............. G06F/3/16 |
| WO | WO 93/14454 A1 | 7/1993 | | |

OTHER PUBLICATIONS

Beach et al ("Eye Tracker System For Use With Head Mounted Displays", IEEE International Conference on Systems, Man, an Cybernetics, Oct. 1998).*

* cited by examiner

*Primary Examiner*—Vijay B. Chawan
(74) *Attorney, Agent, or Firm*—Sughrue Mion, PLLC

(57) ABSTRACT

A system and a method for operating and monitoring, in particular, an automation system and/or a production machine or machine tool. The visual field (9) of a user (1) directed onto at least one display (2) is recorded. Speech information (8) from the user (1) is at least intermittently determined and a visual feedback signal is generated in response to a processing status regarding the determined speech information (8). An improved speech interaction is thus obtained, in particular, in the field of augmented-reality applications and in complex technical plants.

10 Claims, 2 Drawing Sheets

GENERATING VISUAL FEEDBACK SIGNALS FOR EYE-TRACKING CONTROLLED SPEECH PROCESSING

This is a Continuation of International Application PCT/DE01/00138, with an international filing date of Jan. 15, 2001, which was published under PCT Article 21(2) in German, and the disclosure of which is incorporated into this application by reference.

FIELD OF AND BACKGROUND OF THE INVENTION

The invention relates to a system and method for operating and monitoring, for example, an automation system and/or a production machine and/or machine tool.

Such systems and methods are used, for example, in the field of automation technology, in production machines and machine tools, in diagnostic/service support systems, and for complex components, devices and systems, such as, for instance, vehicles and industrial machinery and plants.

OBJECTS OF THE INVENTION

One object of the invention is to provide a monitoring and operating system and an associated method, in particular for an automation system and/or a production machine and/or a machine tool, which enable hands-free operation by persons utilizing the system. It is another object to provide such a system and method that enable users to "navigate" in an environment of augmented reality applications even where complex technical systems are involved. A further object of the invention is to provide such a monitoring and operating system and method having improved speech interaction, in particular where augmented-reality applications and complex technical plants are concerned.

SUMMARY OF THE INVENTION

These and other objects are attained, according to one formulation of the invention, by a system that has detection means for detecting a visual field of a user being directed onto a display; speech recognition means for recognizing speech information of the user; control means for controlling the system; and means for generating a visual feedback signal relating to a processing status of the speech information of the user.

A detection means, e.g., a camera, records the user's visual field on the display means, e.g., a monitor. At the same time, speech recognition means evaluate the user's speech. The detection means and the speech recognition means together form an eye tracking controlled speech recognition system. As a function of the recorded speech information and as a function of the recorded visual field on the display means, certain predefinable information data is displayed. If, for instance, a camera integrated with the display means, e.g., the screen, detects that the user is looking directly at the screen and consequently intends to monitor a corresponding process, the camera as the detection means activates the system's speech recognition means, resulting in a specific evaluation of the speech input. This results in a novel form of interaction for process visualization. If the user looks at another display means or at another field of the display means, control means can be used to display information associated with this visual field on the display means after speech recognition has taken place. This enables the user intuitively to operate and monitor a desired process or a desired production machine and/or machine tool, without using his or her hands, by changing his or her visual field in combination with speech control.

In accordance with the invention, the system additionally has means for generating a visual feedback signal in response to and/or indicative of the processing status of the recognized speech information. This gives the user reliable information regarding the processing status of a speech signal being processed by the system.

One embodiment of the feedback signal that is advantageous and easily recognizable by the user is a visual feedback signal configured as a software object, which is preferably superimposed in the area of the user's detected field of view.

Another means for readily noticeable feedback to support the speech information is to configure the visual feedback signal as a color signal that identifies the corresponding processing status of the detected speech information through color-coding.

Accidental detection and interpretation of speech information that is not intended for the system can be prevented, or specific activation of speech recognition can be achieved by controlling the control means of the system in such a way that the speech recognition means are activated only if the detection means detect that the user's visual field relates to a specific display means and/or at least predefinable areas of the display.

In an advantageous embodiment of the detection means the detection means comprise a camera to detect the user's visual field. However, the detection means may also be embodied in the form of other optical tracking devices presently known or hereafter developed.

Interactive speech communication with the system can be ensured by providing the system with acoustic playback means. These acoustic playback means provide an acoustic rendering of acoustic information data that is generated in response to speech information given specifically by the user through the speech recognition means and is then transmitted to the acoustic playback means.

Specific speech processing is further enhanced by providing the system with additional display means, which are provided, e.g., for signaling the location of information data that is linked to recognized speech information.

BRIEF DESCRIPTION OF THE DRAWINGS

The invention will now be described and explained in greater detail with reference to the exemplary embodiments depicted in the figures in which.

DETAILED DESCRIPTION OF THE PREFERRED EMBODIMENTS

Figure 1:
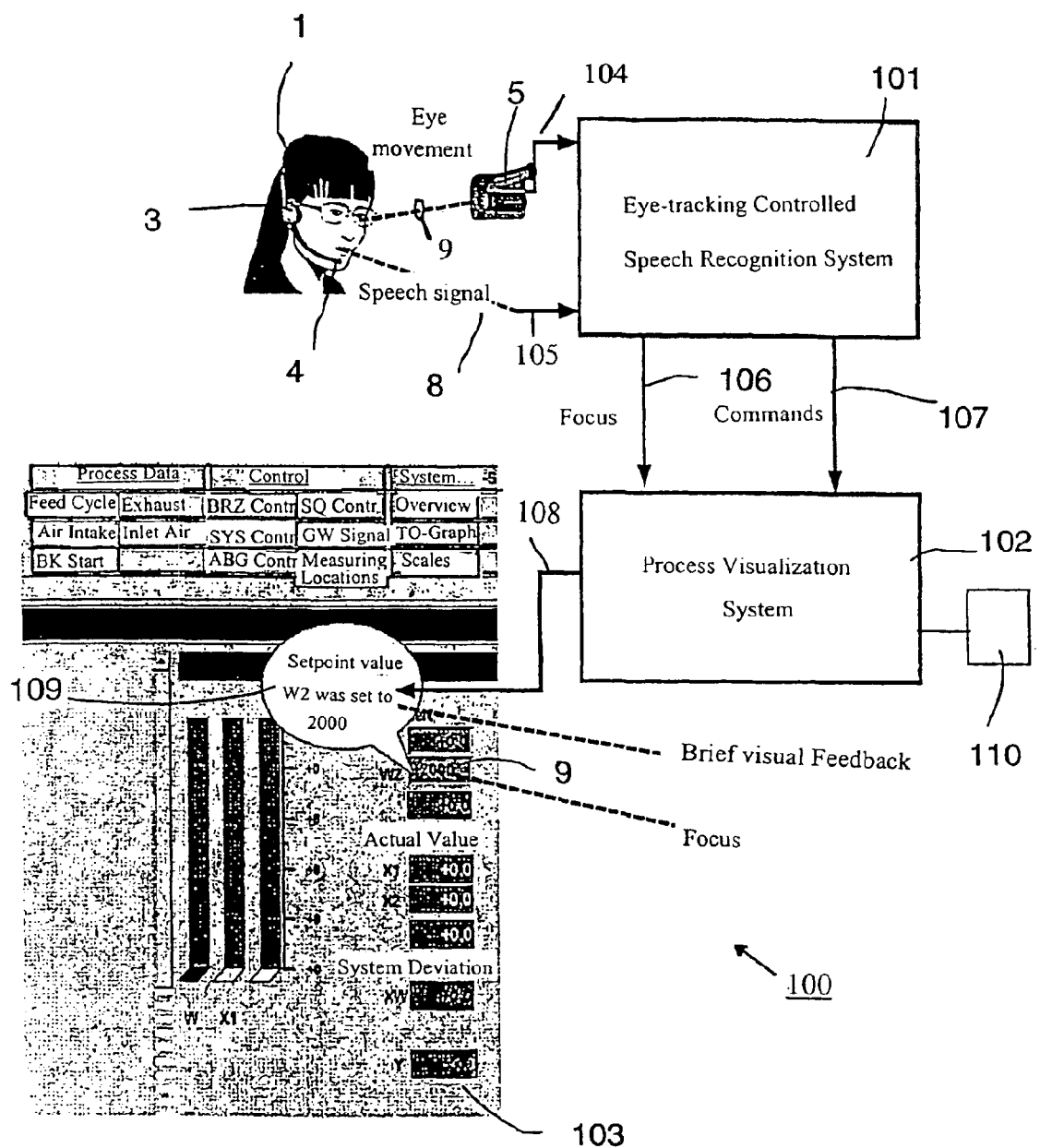
FIG. 1 is a block diagram of an exemplary embodiment of a speech-controlled system for operating and monitoring an automation system or machine tool with a visual feedback signal in the form of a software object and FIG. 2 is a block diagram of an exemplary embodiment of a speech-controlled system for operating and monitoring an automation system or a machine tool with a visual feedback signal in the form of an optical device.

FIG. 1 shows, in a first embodiment, an eye-tracking controlled speech processing system for an operating and monitoring system 100, for instance an automation system 110. The operating and monitoring system includes a process visualization system 102, which enables control of the process of the automation system via, e.g., a screen form 103, such as the one shown in FIG. 1. The automation system 110 is not depicted in greater detail in FIG. 1 for reasons of clarity. The operating and monitoring system further includes an eye-tracking controlled speech recognition unit 101, which receives input signals 104, 105 and supplies output signals 106, 107. The input signal 104 of the eye-tracking controlled speech recognition unit is detected by a camera 5 as the detection means for recording the visual field 9 of a user 1. The input signal 105 is based on a speech signal 8 of the user, which is recorded, for instance, through a microphone 4 of a headset 3 of user 1. The eye-tracking controlled speech recognition system 101 supplies a first output signal 106, which represents the visual field 9 of the user, and a second output signal 107, which is based on the voice signal 8 of the user. As a function of the output signals 106, 107 of the eye-tracking controlled speech recognition unit 1, an output signal 108 is generated in the process visualization system 102 and is superimposed on the screen form 103 as a software object associated with the window that is being displayed in accordance with the user's visual field 9.

The exemplary embodiment of FIG. 1 is based, for instance, on the following scenario:

User 1 monitors an automation system 110 with the aid of the process visualization system 102. The visual field 9 of user 1 is simultaneously tracked by the eye-tracking controlled speech recognition system 101. User 1, through speech, i.e., by emitting a speech signal 8, calls up a desired object, e.g., a certain process value that is contained in visual field 9, or wishes to change a process value contained in visual field 9. In these cases, user 1 calls up the object through speech or calls out the new process value. A visual object 109, which contains the information regarding the processing of the user's speech command, is then superimposed directly within the user's visual field 9. If the control by means of the eye-tracking controlled speech recognition system 101 is successful, the process visualization system 102, and thus the operating and monitoring system 100 incorporating the process visualization system 102, executes the corresponding commands and actions. Using the eye-tracking controlled speech recognition system coupled with a visual feedback signal results in a particularly simple and intuitive man-machine interaction. User 1 receives direct feedback in the form of a brief feedback signal, i.e. the visual object 109, and is informed as to whether his or her speech command 105, 107 was registered, understood and executed by the system 100.

Figure 2:
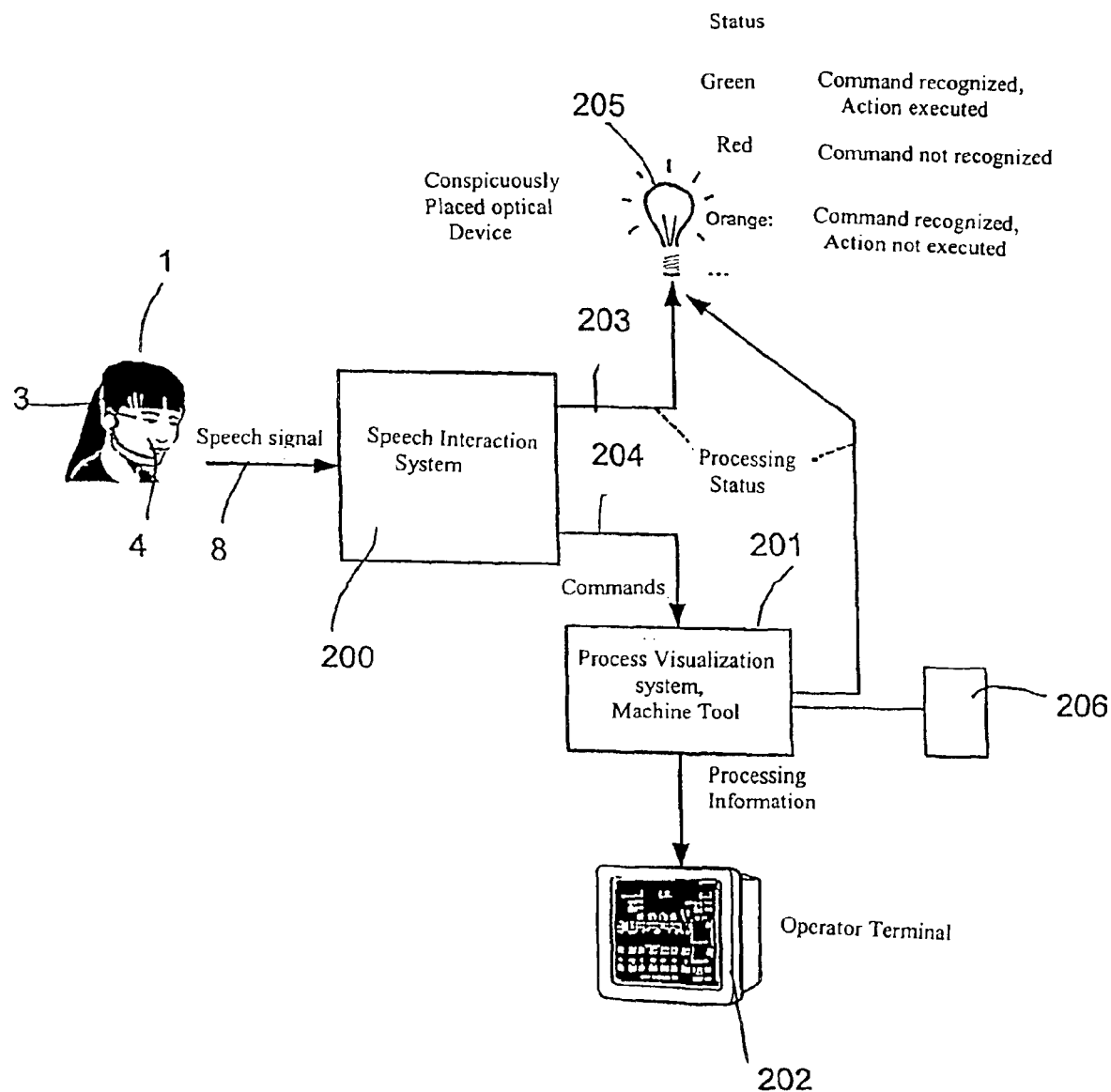

FIG. 2 shows a further exemplary embodiment of an operating and monitoring system with speech recognition and a visual feedback signal for supporting speech interaction in process visualization and in production machines and machine tools. The system comprises a speech interaction system 200 that evaluates a speech signal 8 as an input signal of a user 1. As a function of speech signal 8, the speech interaction system 200 supplies a first output signal 203 and a second output signal 204. The first output signal 203 is supplied to a display means 205 that displays different operating states, e.g., in different colors. The second output signal 204 of the speech interaction system 200 is supplied to a process visualization system 201 of a plant 206 or a machine tool. Visualization and operation and monitoring of plant 206 or the machine tool is effected via an operator terminal 202.

The system depicted in FIG. 2 is based, for instance, on the following scenario. The user, e.g., an operator of a machine tool or a plant 206, monitors plant 206 by means of the process visualization system 201 via the operator terminal 202. The machine tool or plant 206 is not depicted in greater detail in FIG. 2 for reasons of clarity. To execute an action of the plant/machine 206, user 1 uses speech to call out commands in the form of speech signals 8. Through a separately arranged, advantageously conspicuously positioned display device, e.g., in the form of a lamp, user 1 is informed of the processing status of his or her speech command. For instance, a green signal of lamp 205 indicates that a command has been recognized and the desired action has been performed. A red signaling lamp 205 indicates that a command was not recognized. An orange signaling lamp 205 can, for instance, indicate that a command has been recognized but that the corresponding action has not yet been executed. The method for visualizing feedback in response to speech commands for process monitoring as depicted in FIG. 2 is especially suitable in the field of production machine and machine tool control since it provides the user, i.e., the operator, with clear and unambiguous signaling of the processing status of his or her speech command 8 even across, if necessary, relatively large distances.

Applications for which a clearly conspicuous visual feedback to support speech interaction is particularly useful include the application fields "operation and monitoring of process automation systems" as well as "production machines and machine tools." The use of speech processing in the process visualization of technical plants and the control of production machines and machine tools makes possible simpler and more intuitive man-machine interaction.

Since man-machine interaction through speech is very similar to inter-human communication, a faster response is typically expected from the system than for conventional interactions (mouse, keyboard). The user requires immediate feedback whether his speech commands have been registered, understood and executed by the system.

This can be achieved through visual feedback regarding the processing status of the speech commands. With conventional methods, however, this type of feedback is always provided at a fixed location on the operator terminal, so that the operator, e.g. his or her attention to his actual work, is distracted as he looks for this feedback.

According to the invention, in order to prevent the operator's attention from being distracted, a clearly conspicuous visual feedback is provided. Previous solutions provided only for a software-implemented visual object specifically in a fixed position on the operator terminal.

In the inventive solution, similarly to inter-human communication where a person always expects a response from the person he is talking to, there is a response from the system. In a dialog with the computer, the feedback should be provided wherever the user directs his glance, e.g., on the control object that is depicted on the terminal. An eye tracker determines the user's visual field on the screen and the corresponding feedback is superimposed at precisely that location. This method is suitable, in particular, for the management level where the operator is close to the terminals while he monitors the process.

Another method provides for an external optical feedback device (not integrated into the screen) to be clearly placed within the user's field of view. For instance, a lamp that sends different color signals can inform the user as to whether his commands have been recognized, processed and executed. This method is particularly suitable for process monitoring in the field and for controlling production machines and machine tools.

Overall, this results in a clearly conspicuous visual feedback regarding the processing status of the speech command, so that the user is able to receive feedback information without distracting his or her attention from the tasks to be performed.

This basic idea is applicable to, e.g., the following two scenarios:

Scenario A (visual feedback precisely where the operator's attention is focused): The operator is monitoring a plant through a process visualization system. An eye-tracking controlled speech recognition system tracks his or her visual field at the same time.

To look at the details of a certain object, the operator uses speech to call up the object. A visual object containing information on the processing of his speech command (e.g. whether the speech command was understood, and/or whether the speech command has been executed, etc.) is immediately superimposed into his or her visual field. In the meantime, the process visualization system/machine executes the corresponding process steps.

Scenario B (visual feedback through externally positioned optical device): The operator is monitoring a plant by means of a process visualization system. To execute an action of the machine, he uses speech to give corresponding commands. A conspicuously positioned lamp informs him of the processing status of his speech command and whether the corresponding actions are being executed. In the meantime, the process visualization system/machine executes the corresponding process steps.

In summary, the invention thus relates to a system and a method for operating and monitoring, in particular, an automation system and/or a production machine and/or a machine tool. The system recognizes when the visual field 9 of a user 1 is directed at at least one display. Speech information 8 of user 1 is evaluated at least intermittently, and a visual feedback signal is generated in response to the processing status of the recognized speech information 8. This results in improved speech interaction particularly in the field of augmented reality applications even when complex technical systems are involved.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A monitoring and operating system, comprising:

detection means for detecting a visual field of a user being directed onto a display;

speech recognition means for recognizing speech information of the user;

control means for controlling the system; and means for generating a visual feedback signal relating to a processing status of the speech information of the user, wherein the visual feedback signal comprises a color signal that identifies the processing status of the speech information of the user, wherein the color signal comprises a plurality of colors, each of the plurality of colors respectively identifying one of a plurality of processing statuses, and wherein the plurality of processing statuses include a status indicating that the speech information is recognized and a corresponding action has been performed, a status indicating that the speech information is not recognized, and a status indicating that the speech information is recognized, but a corresponding action has not yet been executed.

2. The system as claimed in claim 1, further comprising at least one signal path for signals that operate and monitor at least one of an automation system, a production machine, and a machine tool.

3. The system as claimed in claim 1, wherein the visual feedback signal comprises a software object that is superimposed onto the display in the detected visual field of the user.

4. The system as claimed in claim 1, wherein said detection means comprise a camera for recording the visual field of the user.

5. The system as claimed in claim 1, further comprising acoustic playback means for outputting acoustic information data generated in response to the speech information of the user recognized by said speech recognition means.

6. A method for monitoring and operating a system comprising:

detecting that a user's view is directed onto a display;

at least intermittently recognizing speech information spoken by the user;

generating a visual feedback signal that indicates a processing status regarding the speech information spoken by the user, wherein the visual feedback signal comprises a color signal identifying the processing status of the speech information, and identifying one of a plurality of processing statuses by one of a plurality of colors, wherein the plurality of processing statuses include a status indicating that the speech information is recognized and a corresponding action has been performed, a status indicating that the speech information is not recognized, and a status indicating that the speech information is recognized, but a corresponding action has not yet been executed.

7. The method as claimed in claim 6, further comprising: operating and monitoring at least one of an automation system, a production machine, and a machine tool.

8. The method as claimed in claim 6, wherein the visual feedback signal comprises a software object that is superimposed into the detected user's view.

9. The method as claimed in claim 6, wherein the user's vision is detected with a camera.

10. The method as claimed in claim 6, further comprising transmitting acoustic information data in response to the speech information spoken by the user.

* * * * *